United States Patent [19]

Creekmore et al.

[11] 4,112,158

[45] Sep. 5, 1978

[54] PACKAGING FILMS AND PACKAGED ARTICLES THEREWITH

[75] Inventors: Mark D. Creekmore, Akron; William A. Watts, Uniontown, both of Ohio

[73] Assignee: The Goodyear Tire & Rubber Company, Akron, Ohio

[21] Appl. No.: 837,483

[22] Filed: Sep. 28, 1977

Related U.S. Application Data

[63] Continuation of Ser. No. 617,930, Sep. 29, 1975, abandoned.

[51] Int. Cl.$^2$ .................. B32B 7/02; B65D 71/00; C08L 51/00
[52] U.S. Cl. ........................... 428/35; 53/463; 206/524.6; 206/524.7; 260/876 B; 428/215; 428/517; 428/519; 428/521
[58] Field of Search .............. 206/524.6, 524.7; 53/33; 260/23.7 M, 23.7 R, 32.6 A, 876 B, 846, 829, 28.5 B, 880 B; 428/35, 215, 517, 519, 521

[56] References Cited

U.S. PATENT DOCUMENTS

| | | | |
|---|---|---|---|
| 2,617,775 | 11/1952 | Newberg et al. | 260/889 |
| 3,281,382 | 10/1966 | Kuester et al. | 260/45.8 A |
| 3,434,991 | 3/1969 | Aron | 260/23.7 M |
| 3,595,827 | 7/1971 | Foster | 260/42.43 |
| 3,746,682 | 7/1973 | Watts | 260/28.5 R |
| 3,873,645 | 3/1975 | Muirhead et al. | 260/880 B |
| 3,891,587 | 6/1975 | Watts | 260/28.5 AV |
| 4,017,654 | 4/1977 | Evans et al. | 428/40 |

*Primary Examiner*—William R. Dixon, Jr.
*Attorney, Agent, or Firm*—H. C. Young, Jr.

[57] ABSTRACT

A packaging film composite and packaged articles therewith, said packaged articles include unvulcanized rubber compounding ingredients for unvulcanized rubber and compounding ingredients for thermoplastic polymers. Said packaged film composite is comprised of (1) an unvulcanized elastomeric block copolymer, (2) an anti-block agent selected from (A) stearyl erucamide and behenamide, (B) oleyl palmitamide and behenamide and (C) stearyl erucamide, oleyl palmitamide and behenamide, and, preferably, (3) a thermoplastic resin characterized by being soluble in styrene. The invention further relates to a method of preparing said packaged articles and to compounded high unsaturation rubber and compounded thermoplastic polymers prepared by mixing a package of compounding agents therewith packaged with the film composite of this invention.

28 Claims, 1 Drawing Figure

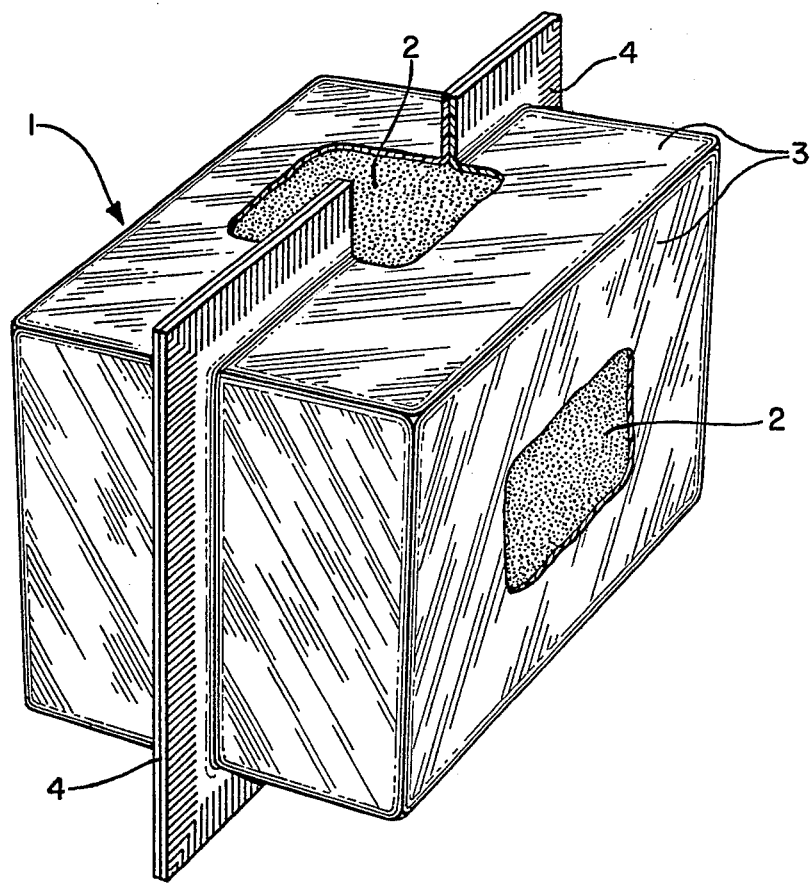

PACKAGING FILMS AND PACKAGED ARTICLES THEREWITH

This is a continuation of application Ser. No. 617,930 filed Sept. 29, 1975 now abandoned.

This invention relates to an elastomeric block polymer film having an antiblock property and particularly to wrapped unvulcanized rubber with such film.

Many films of unvulcanized block copolymers such as styrene-butadiene-styrene block copolymers tend to block or lightly stick together when stacked or rolled against themselves. This blocking or sticking phenomenom can result in a tolerable nuisance or can amount to an intolerable problem. For example, such film wrapping of individual stacked bales of unvulcanized rubber has been observed to be separable only by excessive rupture. Those having skill in the art are generally continually seeking to substantially reduce or eliminate blocking tendencies of films and sheets of the various thermoplastic films, especially those such as the unvulcanized styrene-butadiene-styrene block polymers. Commonly used antiblocking agents which may be compounded with such block polymers include various individual or combinations of waxes, soaps, silicons, pigments, vegetable lecithins and many other ingredients.

Therefore, it is an object of this invention to provide an elastomeric block copolymer film having an antiblock property.

In accordance with this invention, it has been discovered that selected and manipulated combinations of certain primary fatty acid amides exhibit a synergistic antiblock effect when used in an unvulcanized elastomeric block copolymer film to reduce adhesion between layers of the film. In particular, it has been found that less total antiblock agent is required when used in the combinations of this invention than when used separately to attempt to produce the same antiblock effect.

Indeed, it has been discovered that a film composition with a thickness in the range of about 0.5 to about 20, preferably about 1 to about 10 mils, and having an antiblock property comprises an admixture of (1) 100 parts by weight of an unvulcanized elastomeric block copolymer having the general configuration A-B-A wherein each A is an independently selected nonelastomeric monovinyl aromatic hydrocarbon polymer block selected from styrene, α-methyl styrene and vinyl toluene having an average molecular weight of about 7,000 to about 25,000 and a glass transition temperature above about 25° C., the total block A content being from about 20 to about 40 percent by weight of the copolymer, and B is an elastomeric conjugated diene polymer block selected from 1,3-butadiene and isoprene having an average molecular weight from about 30,000 to about 100,000 and a glass transition temperature below about 10° C., said block copolymer being further characterized by having a melt viscosity in the range of about 0.1 to about 10 grams/10 minutes according to ASTM No. D-1238, (2) about 25 to about 120 parts by weight of a thermoplastic resin selected from at least one polymer of styrene, α-methyl styrene, styrene/α-methyl styrene, vinyl toluene, vinyl toluene/α-methyl styrene, indene resins, alkyl phenolic resins; and petroleum and coal tar resins characterized by having an intrinsic viscosity of about 0.02 to about 0.50 as determined in toluene at 30° C. and (3) about 0.5 to about 9 total parts by weight of antiblock agent composed of about 0.1 to about 3 parts by weight individually of stearyl erucamide, oleyl palmitamide and behenamide in combinations of (A) stearyl erucamide and behenamide, (B) oleyl palmitamide and behenamide and (C) stearyl erucamide, oleyl palmitamide and behenamide.

Stearyl erucamide is generally identified as a $C_{39}$ straight chain primary fatty acid amide having the formula $C_{39}H_{77}NO$; oleyl palmitamide is generally identified as a $C_{33}$ straight chain primary fatty acid amide having the formula $C_{33}H_{65}NO$ and behenamide is generally identified as a $C_{22}$ straight chain primary fatty acid amide having the formula $C_{22}H_{45}NO$.

It is understood that such film composite desirably contains various typical lubricants, fillers, pigments and stabilizers.

The elastomeric block copolymers useful in the practice of this invention for the packaging of rubber or various compounding ingredients can be of the radial-type or of the linear type. Generally, styrene-butadiene-styrene block copolymer is desired.

The thermoplastic composition of this invention is typically in the form of a film having a thickness of about 0.4 to about 10 mils and characterized by having an antiblock property according to antiblock test No. 2, hereinafter described, of about 0 to about 10 grams.

In general, the radial-type block copolymers are prepared by coupling AB block polymers with polyfunctional agents as described in U.S. Pat. No. 3,281,382.

In general, the linear block copolymer type is prepared by any of the methods commonly used for block copolymers of styrene and butadiene; for example, (1) by first preparing "living" polystyryl lithium from styrene and an alkyl lithium and adding this to a mixture of styrene-butadiene, (2) by mixing either lithium metal or a dilithium alkyl (e.g., tetramethylene dilithium), both of which are reported to grow at both ends, (3) by preparing polystyryl lithium and sequentially polymerizing butadiene and then styrene, or (4) polymerizing butadiene with polystyryl lithium and coupling with coupling agents known to those skilled in this art.

The thermoplastic aromatic resins useful in the preparation of the films of this invention are aromatic resins desirably selected from styrene, α-methylstyrene, α-methylstyrene/vinyl toluene, α-methylstyrene/styrene, vinyl toluene, indenes, modified phenolics and resins from petroleum and coal-derived monomers, characterized by having an intrinsic viscosity in toluene at 30° C. of about 0.02 to about 0.50.

In general, the aromatic resins are prepared by conventional polymerization techniques, well known to those skilled in the art.

In the practice of this invention, the styrene-butadiene-styrene block polymer/resin blend composition can be prepared by dissolving the block polymer/resin blend in an organic solvent at a temperature in the range of about 40° C. to about 80° C. followed by mixing therewith the required modifiers. The mixture is desirably cast as a film onto a substrate, dried by evaporating the organic solvent to yield the required composition in the form of a film which is then stripped from the casting substrate. Typically, the mixture can be dried at a temperature of about 40° C. to about 150° C. depending primarily upon the organic solvent used. It should be readily understood that if the composition is to be dried as a film, substantially reduced temperatures and times can be used such as temperature in the range of about 70° C. to about 90° C. for a period of about 15 to about 60 minutes.

Unvulcanized rubber can be advantageously packaged according to this invention. Representative of the various unvulcanized rubbers are natural rubber, synthetic cis-1,4-polyisoprene, rubbery polymers of 1,3-butadiene, butadiene-styrene emulsion or solution formed rubbery copolymers and copolymers of butadiene and acrylonitrile. All of these heretofore identified rubbers are of the high unsaturation type. Namely, they contain an appreciable amount of carbon-to-carbon double bonds therein. Although this invention is partly directed to the packaging of the high unsaturation-type rubbers, the low unsaturation type can also be packaged if desired. Representative of such low unsaturation rubbers are butyl rubber, which is typically a copolymer containing a major amount of isobutylene and a minor amount of isoprene, as well as the various ethylene/propylene copolymers and rubbery terpolymers of ethylene/propylene and a minor amount of conjugated diene.

Various rubber compounding resins and ingredients especially resins such as hydrocarbon resins can also be packaged according to this invention and then compounded with the unvulcanized rubber. Representative of the various compounding ingredients are fillers, such as clay, silicates, calcium carbonate and the like; accelerators, such as, for example, cadmium diethyldithiocarbamate, tetramethyl thiuram disulfide, benzothiazyl disulfide and the like; antioxidants, such as the well known substituted phenolic, substituted thio esters and amine type; antiozonants, such as aniline derivatives, diamines and thioureas; curatives, such as sulfur, sulfur providing compounds and peroxides; ultraviolet agents such as substituted benzotriazoles and substituted benzophenones; color pigments, such as iron oxide, titanium dioxides and organic dyes; reinforcing pigments, such as carbon black, zinc oxide and hydrated silicon compounds; and processing aids, such as polyethylenes, silicon dioxide, pumice and stearate.

The antiblock combination of materials of this invention for the preparation of films is particularly useful where the packaged materials are stacked or "containerized" together in order to prevent them from sticking to each other and making them virtually impossible to separate without actually destroying portions of the package and material. The importance of such a discovery is amplified by the following discussion.

Polyethylene film (PE) is generally used to overwrap bales of rubber to simplify handling and use. For most applications, the overwrapped bale is used intact; thus, the bale is charged into a banbury or another suitable mixer and the PE film is dispersed throughout the rubber compound during the mixing cycle. However, in various applications, the dispersed PE films has caused defects to occur in the end-product curing use and is, therefore, not a suitable overwrap. Films of this invention disperse readily in a rubber compound when mixed using conventional equipment. Even if complete dispersion is not achieved, defects in the subject film are minimized because of the inherent ability to co-cure in the rubber matrix.

In other applications, PE film can present problems. For the production of high impact polystyrene (HIPS) polybutadiene rubber (BR) or butadiene/styrene rubber (SBR) is added directly to the styrene monomer. The overwrap must be characterized by being soluble in styrene, and, therefore, PE film is not considered suitable for this application. Thus, HIPS film is used to overwrap SBR or BR for use in the production of HIPS, which presents an entirely different problem. If the SBR or BR overwrapped with HIPS film does not meet rigid specification limits, the SBR or BR cannot be suitably used for the manufacture of HIPS and is not suitable for conventional uses because the HIPS film does not disperse readily in rubber compounds during mixing cycles. However, the composite film of the present invention, having an additional enhanced structural stability, is soluble in styrene, dispersible in rubber compounds during conventional mixing cycles, and has the ability to co-cure in the rubber matrix. Therefore, the composite of this invention overcomes the previous deficiencies and eliminates a requirement for maintaining an inventory of two (PE and HIPS) packaging films.

Because of the technical advantages cited above, the film composite of this invention with its antiblock property, can readily be used for the packaging of various compounding ingredients for unvulcanized rubber and various plastics where (1) dispersability, (2) ability to co-cure with rubber, or (3) styrene solubility is a requisite.

Therefore, in further accordance with this invention, a packaged unvulcanized rubber, particularly a high unsaturation rubber as hereinbefore described and particularly a packaged unvulcanized rubber for storage, comprises such unvulcanized rubber substantially encompassed with a wrap of the film composite of this invention with its antiblock feature. In practice, the film is generally applied around the unvulcanized rubber, especially when in bale form, usually under some tension so that it more firmly wraps the rubber and then heat sealed against itself to complete the package.

In additional accordance with this invention, a method of compounding rubber is provided, and the corresponding compounded rubber, is provided which comprises mixing, and the resulting admixture including the sulfur cured admixture, said method comprising mixing packaged unvulcanized rubber, particularly hereinbefore described high unsaturation rubber, wrapped with the film composite of this invention, having the special antiblock feature, with conventional compounding ingredients, particularly such ingredients packaged in the film composite of this invention, optionally followed by sulfur curing said prepared mixture of rubber, packaging film and packaged compounds.

For further understanding of this invention, reference may be had to the accompanying FIGURE in which a perspective view of a wrapped rubber bale is presented having a cut-away portion.

Referring to the FIGURE, a large packaged bale (1) of unvulcanized natural rubber (2) is shown. The packaging film (3) is a composite having a thickness of about one mil comprised of 100 parts styrene/butadiene/styrene unvulcanized elastomeric block copolymer containing about 35 percent bound styrene, about 100 parts α-methyl styrene polymer, about 5 parts synergistic anti-block imparting agent selected from agents (A), (B) and (C), hereinbefore described and a minor amount of stabilizer. The bale (2) is packaged by wrapping two sheets of the film (3) and heat sealing their end portions (4) to complete the closure. Similarly packaged bales are stacked with their heat-sealed film portions around their sides which are easily separated several days later without film rupture.

The practice of this invention is further illustrated by reference to the following example which is intended to be representative rather than restrictive of the scope of the invention. Unless otherwise indicated, all parts and percentages are by weight.

EXAMPLE I

A series of films were prepared by dispersing and dissolving a styrene-butadiene-styrene block polymer, α-methyl styrene polymer and selected anti-block agents in tetrahydrofuran at about 50° C. to about 55° C. using a low-speed, laboratory air stirrer and then casting the solutions on glass plates. The cast polymer solution was partially dried on the plates in a plate oven at about 50° C. The partially dried films were then completely dried in a dynamic air oven at 78° C. for about 30 minutes to provide a tough translucent film having a thickness of about 1 mil.

The anti-block agents used in this example are individual primary fatty acid amides and combinations thereof. As used in this example, Agent No. 1 is stearyl erucamide, Agent No. 2 is oleyl palmitamide and Agent No. 3 is behenamide.

The various combinations of anti-block agents for the styrene-butadiene-styrene block polymer/resin blend composition were used in the preparation of the various solutions into films which are identified herein as Formulations 1–7 of which Formulations 1–4 are controls.

In particular, the actual Formulations 1–7 are more clearly represented in the following Table 1 which relates the formulations with various mixtures of the styrene-butadiene-styrene block polymer/resin blend and mixtures of modifiers.

TABLE 1

| Formulations[1] | 1 | 2 | 3 | 4 | 5 | 6 | 7 |
|---|---|---|---|---|---|---|---|
| SBS Block polymer | 100 | 100 | 100 | 100 | 100 | 100 | 100 |
| α-methyl styrene resin | 100 | 100 | 100 | 100 | 100 | 100 | 100 |
| Agent No. 1 | — | 2.0 | — | — | 1.5 | — | 1.0 |
| Agent No. 2 | — | — | 2.0 | — | — | 1.5 | 0.5 |
| Agent No. 3 | — | — | — | 2.0 | 1.0 | 1.0 | 1.0 |
| Combinations of Agents[2] | | No. 1 | No. 2 | No. 3 | 1 + 3 | 2 + 3 | 1 + 2 + 3 |

[1]Formulations 2, 3 and 4 are controls using individual modifying compounds, whereas Formulation No. 1 uses none of the Agents.
[2]Agent combinations 1 + 3, 2 + 3, and 1 + 2 + 3 represent Agents A, B and C as described in this specification.

Films of each of the Formulations 1–7 were submitted to two antiblock tests. The antiblock test is a measure of the force in grams required to separate films from another test film. Results of these antiblock tests of the films prepared according to Formulations 1–7 are more clearly shown in Table 2.

TABLE 2

| Formulations | 1 | 2 | 3 | 4 | 5 | 6 | 7 |
|---|---|---|---|---|---|---|---|
| Block test(1) in gms | T* | 50 | 60 | 100 | 1 | 1 | 1 |
| Block test(2) in gms | T | T | T | T | 2 | 2 | 2 |

*T - Film tore during testing (above about 1000 gms force).

The results of the tests of Formulations 1–7 as more clearly shown in Table 2 demonstrates that special combinations of selected fatty acid amides, particularly Formulations 5–7 using Agents A, B and C, synergistically provide a composition of antiblock for the styrene-butadiene-styrene block polymer/resin blend while retaining acceptable strength properties of films thereof.

In this example, the antiblock test No. 1 involves placing two film samples together so that a 2 inch × 2 inch 2-ply specimen is obtained. This specimen is placed between two metal plates in a horizontal position and a 0.5 pound per square inch pressure is exerted evenly over the entire plate. The resulting assembly is placed in a dynamic hot air oven at 50° C. for 24 hours. At the end of this period, the film is tested for blocking (sticking or adhesion) resistance by measuring the force in grams required to separate the films by attempting to pull them apart at about 90° angle and a rate of about 20 inches per minute.

The block test No. 2 is accomplished by first placing two film samples together so that a 2 inch × 2 inch 2-ply specimen is obtained. This specimen is placed between two metal plates in a horizontal position and a 1.6 pounds per square inch pressure is placed on top of the upper plate. The assembly is placed in a static hot air oven at about 77° C. for 24 hours. At the end of this period, the film is tested for blocking resistance by measuring the force in grams to separate the films by attempting to pull them apart at about 90° angle at a rate of 20 inches per minute.

As particularly demonstrated by this example, it has been discovered that special types of combinations of anti-block agents co-act to surprisingly provide a film having antiblock properties at 77° C. with a load of 1.6 psi. The example further illustrates a more preferred range of individual amounts of antiblock agents which is about 0.5 to about 1.5 parts by weight per 100 parts by weight styrene-butadiene-styrene block polymer, with the overall more preferred desired total amount of anti-block being in the range of about 1.0 to about 4.0 parts by weight per 100 parts of the styrene-butadiene-styrene block polymer. Indeed, it should be pointed out, in accordance with the synergistic effect of this invention, that the total amount of agent used in one of the required combinations provides a very substantially improved antiblock property when compared to any one of the agents used alone.

In the description of this invention, the film composite has conveniently been demonstrated as being prepared by a cast process. It should be understood that the film composite can also be prepared by various melt processing techniques, such as, for example, by extrusion and by calendering.

Also, the invention has primarily been described in its preferable form by utilizing a film composite of A-B-A block copolymer, styrene soluble thermoplastic resin and antiblock agent. It should be pointed out, however, that a packaging film satisfactory for some purposes can be prepared without the styrene soluble thermoplastic resin.

Because of the styrene-solubility requirement of the thermoplastic resin additive and, indeed, desired styrene solubility of the film composite itself, the invention is particularly applicable for compounding thermoplastic polymers. In such application, a thermoplastic polymer is compounded by adding compounding ingredients thereto in a package of the film composite of this invention. Such application is particularly useful in the compounding of polystyrene, especially high impact polystyrene.

While certain representative embodiments and details have been shown for the purpose of illustrating the invention, it will be apparent to those skilled in this art that various changes and modifications may be made therein without departing from the spirit or scope of the invention.

What is claimed is:

1. A packaging film composite having a thickness in the range of about 0.5 to about 10 mils comprised of an admixture of (1) 100 parts by weight of an unvulcanized elastomeric block copolymer having the general configuration A-B-A wherein each A is an independently selected nonelastomeric monovinyl aromatic hydrocarbon polymer block selected from styrene, α-methylstyrene and vinyl toluene having an average molecular weight of about 7,000 to about 25,000 and a glass transition temperature above about 25° C., the total block A content being from about 20 to about 40 percent by weight of the copolymer, and B is an elastomeric conjugated diene polymer block selected from 1,3-butadiene and isoprene having an average molecular weight from about 30,000 to about 100,000 and a glass transition temperature below about 10° C., said block copolymer being further characterized by having a melt viscosity in the range of about 0.1 to about 10 grams/10 minutes according to ASTM No. D-1238, (2) about 0.5 to about 9 total parts by weight of antiblock agent composed of about 0.1 to about 3 parts by weight individually of stearyl erucamide, oleyl palmitamide and behenamide in combinations of (A) stearyl erucamide and behenamide, (B) oleyl palmitamide and behenamide and (C) stearyl erucamide, oleyl palmitamide and behenamide, and (3) about 25 to about 120 parts by weight of a thermoplastic resin selected from at least one polymer of styrene, α-methyl styrene, styrene/α-methylstyrene, vinyl toluene, vinyl toluene/α-methylstyrene, indene resins, alkyl phenolic resins and petroleum and coal tar resins, said resins characterized by being soluble in styrene and by having an intrinsic viscosity of about 0.02 to about 0.50 as determined in toluene at 30° C.

2. The packaging film composite of claim 1 comprised of an admixture of (1) 100 parts by weight of an unvulcanized styrene-butadiene-styrene elastomeric block copolymer, (2) about 0.5 to about 9 total parts of said anti-block agent, and (3) about 25 to about 120 parts by weight of a thermoplastic resin selected from at least one polymer of styrene, α-methylstyrene and styrene-/α-methylstyrene.

3. The packaging film composite of claim 2 having a thickness in the range of about 0.5 to about 10 mils and characterized by having an anti-block property according to anti-block test No. 2 of about 0 to about 10 grams and where said block copolymer is selected from radial type or linear block copolymers.

4. In a package of an article wrapped in a film of an unvulcanized block copolymer, the improvement in which the package is comprised of (A) at least one article selected from the group consisting of unvulcanized rubber, compounding ingredients for unvulcanized rubber and compounding ingredients for thermoplastic polymers wrapped in (B) the protective film composite of claim 1.

5. The package of claim 4 where said article is unvulcanized high unsaturation rubber.

6. The package of claim 4 where said film composite is an admixture of a styrene-butadiene-styrene block copolymer, said anti-block agent and at least one thermoplastic resin selected from polymers of styrene, α-methylstyrene and styrene/α-methylstyrene.

7. The package of claim 6 wherein said article is a high unsaturation rubber.

8. The package of claim 7 wherein said article is selected from butadiene/styrene copolymers, polybutadiene and cis-1,4-polyisoprene and where said article is tightly wrapped with said protective film composite having a thickness in the range of 0.75 to about 5.0 mils and optionally heat sealed.

9. The package of claim 4 wherein said article is at least one compounding ingredient for unvulcanized rubber.

10. The package of claim 9 where said article is comprised of at least one compounding ingredient for unvulcanized high unsaturation rubber selected from resins, fillers, accelerators, antioxidants, antiozonants, sulfur and peroxide-type curatives and processing aids.

11. The package of claim 10 where said article is selected from at least one of hydrocarbon resins; fillers selected from clay, silicates and calcium carbonate; accelerators selected from cadmium diethyldithiocarbamate, tetramethyl thiuram disulfide, benzothiazyl disulfide; phenolic substituted thio ester and amine-type antioxidants; aniline derivative, diamine and thiourea antiozonants; sulfur-providing and peroxide curatives; iron oxide and titanium dioxide color pigments; carbon black, zinc oxide and hydrated silicon compound reinforcing pigments; and polyethylene, silicon dioxide, pumice and stearate processing aids.

12. The package of claim 11 where said film composite is an admixture of a styrene-butadiene-styrene block copolymer, said anti-block agent and at least one thermoplastic resin selected from polymers of styrene, α-methylstyrene and styrene/α-methylstyrene.

13. The package of claim 4 where said article is at least one compounding ingredient for thermoplastic polymers.

14. The package of claim 4 where said article is at least one compounding ingredient for polystyrene.

15. A compounded high unsaturation rubber prepared by mixing a package of claim 4 wherein said article is an unvulcanized high unsaturation rubber with an additional package of claim 4 wherein said article is at least one compounding ingredient for said unvulcanized high unsaturation rubber.

16. A compounded thermoplastic polymer prepared by mixing a thermoplastic polymer with a package of claim 4 wherein said article is at least one compounding ingredient for said thermoplastic polymer.

17. The compounded thermoplastic polymer of claim 16 wherein said thermoplastic polymer is polystyrene.

18. A compounded high unsaturation rubber prepared by mixing an unvulcanized high unsaturation rubber with a package of claim 10 where said article is at least one compounding ingredient for the unvulcanized high unsaturation rubber.

19. The compounded high unsaturation rubber of claim 18 where said film composite is an admixture of a styrene-butadiene-styrene block copolymer, said antiblock agent and at least one thermoplastic resin selected from polymers of styrene, α-methylstyrene and styrene-/α-methylstyrene.

20. The compounded high unsaturation rubber of claim 18 where said high unsaturation rubber is at least one of butadiene/styrene copolymers, polybutadiene or cis 1,4-polyisoprene.

21. The compounded rubber of claim 18 which is sulfur cured.

22. The compounded rubber of claim 19 where said high unsaturation rubber is selected from at least one of butadiene/styrene copolymers, polybutadiene and cis-1,4-polyisoprene.

23. The compounded rubber of claim 22 which is sulfur cured.

24. The compounded rubber of claim 19 where said packaged article is comprised of at least one compounding ingredient for unvulcanized high unsaturation rubber selected from resins, fillers, accelerators, antioxidants, antiozonants, sulfur and peroxide-type curatives and processing aids.

25. The compounded rubber of claim 24 where said packaged article is selected from at least one of hydrocarbon resins; fillers selected from clay, silicates and calcium carbonate; accelerators selected from cadmium diethyldithiocarbamate, tetramethyl thiuram disulfide, benzothiazyl disulfide; phenolic, substituted thio ester and amine-type antioxidants; aniline derivate, diamine and thiourea antiozonants; sulfur-providing and peroxide curatives; iron oxide and titanium dioxide color pigments; carbon black, zinc oxide and hydrated silicon compound reinforcing pigments; and polyethylene, silicon dioxide, pumice and stearate processing aids.

26. The compounded rubber of claim 25 which is sulfur cured, where said rubber is selected from at least one of butadiene/styrene copolymers, polybutadiene and cis-1,4-polyisoprene.

27. In a method of preparing a package of an article wrapped in a film of an unvulcanized block copolymer, the improvement which comprises (i) wrapping an article selected from unvulcanized rubber, compounding ingredients for unvulcanized rubber, and compounding ingredients for thermoplastic polymers with a protective film composite which is compatible with said unvulcanized rubber or thermoplastic polymer, said film having a thickness of about 0.5 to about 10 mils and comprised of an admixture of (1) 100 parts by weight of an unvulcanized elastomeric block copolymer having the general configuration A-B-A wherein each A is an independently selected nonelastomeric monovinyl aromatic hydrocarbon polymer block selected from styrene, α-methylstyrene and vinyl toluene having an average molecular weight of about 7,000 to about 25,000 and a glass transition temperature above about 25° C., the total block A content being from about 20 to about 40 percent by weight of the copolymer, and B is an elastomeric conjugated diene polymer block selected from 1,3-butadiene and isoprene having an average molecular weight from about 30,000 to about 100,000 and a glass transition temperature below about 10° C., said block copolymer being further characterized by having a melt viscosity in the range of about 0.1 to about 10 grams/10 minutes according to ASTM No. D-1238, (2) about 0.5 to about 9 total parts by weight of antiblock agent composed of about 0.1 to about 3 parts by weight individually of stearyl erucamide, oleyl palmitamide and behenamide in combinations of (A) stearyl erucamide and behenamide, (B) oleyl palmitamide and behenamide and (C) stearyl erucamide, oleyl palmitamide and behenamide, and (3) about 25 to about 120 parts by weight of a thermoplastic resin selected from at least one polymer of styrene, α-methylstyrene, styrene/α-methylstyrene, vinyl toluene, vinyl toluene/α-methylstyrene, indene resins, alkyl phenolic resins, and petroleum and coal tar resins, said resins characterized by being soluble in styrene and by having an intrinsic viscosity of about 0.02 to about 0.50 as determined in toluene at 30° C., and, optionally, (ii) heat sealing the film to complete the package.

28. The method of claim 27 where said protective film composite is comprised of (1) 100 parts by weight of unvulcanized styrene-butadiene-styrene block copolymer, (2) about 0.5 to about 9 total parts of said antiblock agent and (3) about 25 to about 120 parts by weight of a thermoplastic resin selected from at least one polymer of styrene, α-methylstyrene and styrene-/α-methylstyrene.

* * * * *